May 23, 1967  A. G. BODINE  3,320,992
JUICE EXTRACTING METHOD UTILIZING SONIC WAVES
Filed Feb. 10, 1964
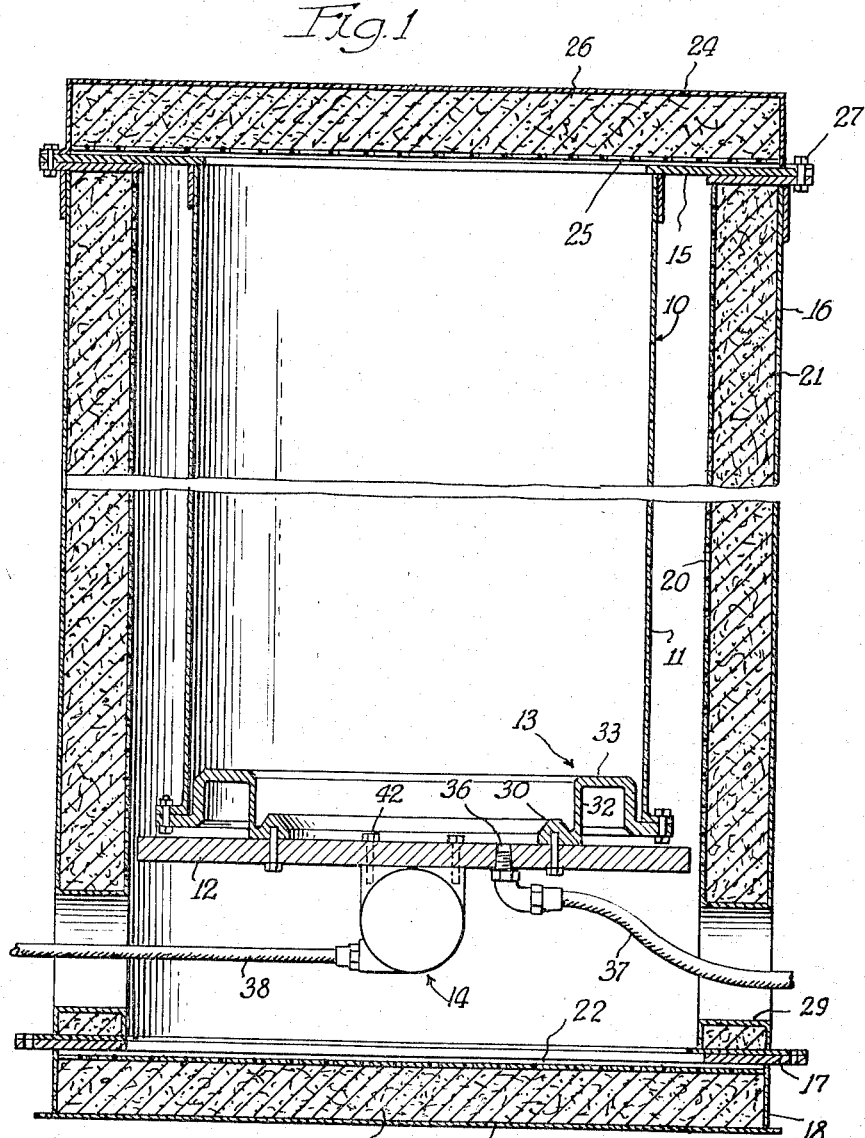
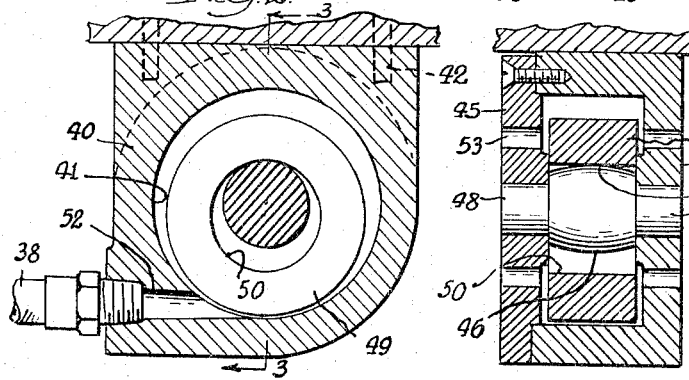
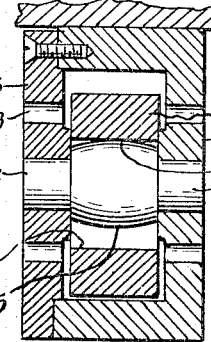
INVENTOR.
Albert G. Bodine
BY
Attorney

United States Patent Office 3,320,992
Patented May 23, 1967

3,320,992
JUICE EXTRACTING METHOD UTILIZING
SONIC WAVES
Albert G. Bodine, Los Angeles, Calif.
(7877 Woodley Ave., Van Nuys, Calif. 91406)
Filed Feb. 10, 1964, Ser. No. 343,852
3 Claims. (Cl. 146—227)

This invention relates generally to processes for extracting liquid constituents from parent bodies by use of high intensity sonic waves, and more particularly to methods for extracting juices from vegetable matter.

The present invention is directed generally to extraction of juices from vegetable matter. For the purpose of this application, the word "vegetable" is to be taken in its broad sense as inclusive of all plant growth types of matter, and thus inclusive of vegetables, grasses, fruits, and the like. The field of the invention is thus, by the same token, exclusive of mineral or animal matter. More particularly, the invention is especially applicable to vegetable matter comprised of closely spaced or matted elongated fibers around, between and within which a liquid or juice substance is tightly bound.

A typical vegetable material to which the invention is especially applicable is sugarcane, comprised essentially of longitudinal fibers and juice bound therein or therebetween. Conventionally, the juice is expressed from sugarcane by means of mechanical presses, which, however, have known limitations. One particular object of the invention is therefore the provision of a process and apparatus by which juice can be extracted from sugarcane more effectively, completely, and efficiently through the action of sonic vibrations transmitted therethrough. Other vegetable substances have a physically similar make-up. i.e., fibers and bound juice, and are susceptible to the process. Broadly, of course, the invention is applicable to any vegetable substance that will respond acoustically to the invention.

Taking sugarcane as a vegetable material representative of those which can be treated effiectively by the process of the invention, this vegetable material comprises, as mentioned above, closely spaced fibers which run longitudinally of the cane, and within, between and around which are the juices that are required to be removed.

The present invention involves the application to the vegetable substance of sonic waves of relatively low frequency as compared with the audible spectrum, typically of say from 20 cycles per second to an order of hundreds of cycles per second, but at relatively great amplitude or intensity. A mechanical orbital-mass type of sound wave generator is especially applicable, because such generators readily produce relatively high amplitude in the comparaticely low frequency range mentioned, and have other unique features of advantage. In the process of the invention, the sugarcane, or other vegetable substance, is first chopped up, preferably into fairly small pieces or chunks, though the size is not critical. The chopped material is then placed in a treatment chamber, and preferably, unless the chopping has released sufficient juice to serve the purpose, covered with a small quantity of liquid such as water to serve as an acoustic coupling medium. As the process proceeds, sufficient juice is generally extracted to act or substitute thereafter as the coupling medium. Within the treatment chamber, or forming a portion of one wall thereof, is a sound wave radiating surface which is vibrated by the aforementioned mechanical oscillator. The sound wave radiating surface radiates sound waves which are transmitted via the liquid coupling medium to and through the pieces of sugarcane. It is a feature of the invention that the vibrating surface is on a resonant member, driven at its resonance frequency by the mechanical oscillator, and that this resonant member has an output impedance which is sufficiently well matched to the coupling liquid and to the juice within the vegetable substance to assure a good acoustic coupling thereto, and therefore good transference of acoustic energy to and through the vegetable substance. In this connection, the output impedance of the wave radiator surface is the ratio of oscillating pressure amplitude to velocity amplitude, while the impedance of the coupling liquid, as well as of the vegetable fiber, is in each instance the ratio of oscillating pressure amplitude to velocity amplitude when subjected to a sound field. For good acoustic coupling, and good sonic energy transference from oscillator to vegetable juice, and to vegetable fiber, these several impedances must not be too widely divergent or "unmatched" to one another. The mechanical oscillator or sound wave generator, and resonant acoustic wave radiator, as used in the invention, and hereinafter more particularly disclosed, have inherently an output impedance which is sufficiently well matched to the those of the coupling liquid and fiber to assure good acoustic coupling and sonic energy transference to the vegetable substance for the purpose of the invention.

The sonic wave energy has an action on the vegetable substance which results in a differential vibration of the fibers and the juice. To begin with, the acoustic impedances of the fiber and of the juice, while within a range which matches sufficiently well with the output impedance of the oscillator and radiator, do inherently differ somewhat from one another, both in magnitude and phase angle. These differences come about because of differences in density, in elasticity, and in frictional resistance when caused to vibrate by reason of transmission of sonic waves therethrough. With differences in impedance, the fiber and juice substances must vibrate at different amplitudes and in different time phase in response to transmission therethrough of a sonic wave. Involved in this process is the fact that sound wave transmission results in the juice and fiber ingredients vibrating with different accelerations, and to different maximum velocities. The differential movements and displacements thus brought about will be seen to periodically move the liquid relative to the fibers.

Further, the velocity of sound in fiber differs from that in the juice. Thus the sound wave transmitted through the sugarcane will travel at a different velocity when or where it encounters a fibrous transmission path than when or where it finds continuous paths through the juice between and around the fibers. By reason of reflections at the interfaces between the fibers and juice, the waves tend to remain within whichever medium they are already in. One consequence of these conditions is that the waves travel at different speeds through the juice and the fiber, and thus soon fall out of phase with one another in adjacent portions of fiber and juice. The fiber and juice thus, for this additional reason, have movement relative to one another.

Thus the juice periodically moves relative to the fibers, and so washes back and forth over, around and between the fibers, and over the surfaces thereof.

The overall result is that the juices are extracted from within, around and between the fibers. The physical result, insofar as removal of juices is concerned, is to some extent like heating, though produced without significant temperature rise. Avoidance of substantial heating is of course important, particularly in vegetable juice extraction, where heating may in many cases be undesirable.

The low frequency, high amplitude waves, with their described effect in causing periodic sonic frequency relative movements of fiber and bound juice, cause the acoustic coupling juice (or, in the beginning stages, the coupling liquid, e.g., water) to penetrate to a substantial depth between the fibers of gross pieces of vegetable matter, dissolving the bound juice, and washing it out. Extracted juice can, as intimated above, be used as a penetrating and extracting agent for removing further juice from the fiber. The low frequency, high amplitude sonic waves activate the juices in such manner that the juices behave like a physical solvent, extracting further juice from the fiber. The chunks of fibrous vegetable matter tend to disintegrate as the juice is extracted therefrom. The large amplitude waves tend to cause the various vegetable constituents within the fibers to vibrate with fairly large amplitude, so that they experience fairly large cyclic excursion distance. This results in a great reduction in the adherence of one for the other. In effect, resistance to penetration of the juice is reduced, and a deep cyclic penetration is experienced. This tends to bring various constituents of the juice into contact with solid material suspended therein. The result is that the juice has an enhanced ability to function as a solvent for removing the juice constituents from the fiber material.

As has already been mentioned, the impedance mismatch between the juice and the fiber, or fiber layers or mats, tends to result in relative sonic-frequency motion between the juice particles and the fiber particles, and, by making use of relatively low frequency, large amplitude waves, this relative motion, in terms of both velocity and acceleration, attains fairly large magnitude. Thus there is a large relative periodic displacement between the juice particles and the parent fiber material tending to hold it. The result is that the liquid in which the material is bathed, which is preferably juice from the vegetable which has already been extracted, is thus capable of extracting the desired juice material or particles out from the fibers. Thus, in this connection, it is important to recognize that one novel aspect of the invention is the use of mechanical oscillators or transducers which produce high amplitude, low frequency sound waves, which are especially effective in juice extraction.

As mentioned in the foregoing, the treatment chamber or container in which pieces or chunks of the vegetable material to be treated has been loaded is initially partially filled with water to function as an acoustic coupling agent between the sound wave radiating surface and the chunks to be treated. Ultimately, however, this water becomes saturated with juice, and as the process continues, the liquid becomes substantially all vegetable juice. An alternative procedure in accordance with the invention is to place chunks of raw material in its natural juice, left over from a preceding treatment, with no water at all being used. The important point is that the most highly effective extraction effect of the invention takes place when the coupling liquid is the juice of the vegetable itself. This juice becomes a very active solvent for its own constituents when driven by the particular kind of sound wave action described herein.

It is of course feasible to carry out the process of the invention in a multi-stage arrangement wherein the fibrous material is subjected to treatment in a succession of stages each designed to extract some of the juice left over from the preceding stage, so as to eventually extract all of the juice. This is an especially effective procedure in cases wherein the juice tends to become so thick that it loses some of its penetrating quality.

Another characteristic action and feature of the process is that the large amplitude, low frequency sonic waves tend to cause the groups of fiber particles to undergo relatively large amplitude flexing, which flexing in turn tends to mobilize the juice substance within and between the fibers.

The invention will be better understood by referring now to the following detailed description of a suitable treating apparatus for carrying the invention into effect, reference for this purpose being had to the accompanying drawings, in which:

FIG. 1 is a vertical, longitudinal section through an apparatus in accordance with the invention;

FIG. 2 is a section taken transversely through a vibration generator forming a part of the apparatus of FIG. 1; and FIG. 3 is a section taken on line 3—3 of FIG. 2.

In the drawings, the numeral 10 designates generally a treatment chamber comprised of a cylindric sidewall 11, a thick bottom plate 12, and a flexible ring member 13 interconnecting the sidewall and bottom plate. The plate 12 may be typically in a range of from three feet to ten feet in diameter. A vibration generator or transducer 14 is mounted on the bottom of plate 12, and sets said plate into resonant vibration. The frequency is relatively low, typically, from say about 20 c.p.s. at the low end to something of the order of hundreds of cycles per second.

The cylindric sidewall 11 is suspended from a flat ring 15 which extends outwardly in a horizontal plane, and is mounted on a cylindric external casing 16. The latter is mounted at the bottom on a base ring 17, which is in turn mounted on a base consisting of a short cylindrical sidewall 18 and a bottom plate 19. For sound insulation purposes, there is preferably provided, midway between the treatment chamber 10 and the exterior casing 16, a cylindrical screen 20, and the space between this screen and the exterior casing 16 is packed with suitable sound insulation material 21, such as Micro-Lite. For the same purpose, a screen 22 extends across the top of the sidewall 18 of the base, and sound insulation material 23 is packed between this screen 22 and bottom plate 19. Also, preferably, the apparatus is provided with a sound insulated cover 24, comprised of a cylindric top and sidewall, and a screen 25 across the bottom thereof, sound insulation material 26 being packed therein, as indicated. This cover 24 may simply rest on ring 15, being prevented from dislodgement by the heads of assembly screws 27.

The bottom plate 12 of the treatment chamber 10 is suitably spaced above the base of the apparatus so as to accommodate the vibration generator 14, with sufficient space being provided to permit free access to generator 14 when desired. Access is had to this space through suitable openings 28 defined by sleeves 29 fitted between the exterior casing 16 and screen 20.

In the embodiment here shown, the flexible connecting ring 13 is designed in relation to the flexural sound wave pattern set up in the resonant bottom plate 12 by the vibration generator 14. The vibration generator, the details of an illustrative embodiment of which will be set forth presently, may be assumed to generate and apply to the bottom of plate 12, at its center, a vibration having a large amplitude component of vibratory motion normal to the plate. Such vibration, when at the resonant frequency of the plate for a desired resonant mode of vibration, sets the plate into elastic vibration at relatively large amplitude in the desired predetermined wave pattern. A desirable fundamental frequency wave pattern consists in an alternating upward and downward elastic "bowing" of the plate. In this action, there is an elastic vertical oscillation of the central area of the plate, a similar elastic vertical oscillation, but of opposite phase, of the rim portion of the plate, and an annular nodal region of minimized or zero oscillation between the two. The deflection amplitude of the central area of the plate is maximum at the center, and tapers to zero at the nodal region. The deflection radially outward from the nodal region is of progressively increasing amplitude. In other words, the plate flexes elastically at the vibration frequency, deflecting upwardly in its central region while deflecting downwardly in its outer region, and then downwardly in the central region and upwardly in the outer region, while the intermediate nodal region remains substantially stationary.

The connection ring 13 between the treatment chamber sidewall 11 and the bottom plate 12 has, as shown in the illustrative example, an inner flange 30 fastened to bottom plate 12, as by studs 31, and this mounting to the plate 12 is preferably located at, or just inside, the nodal region of plate 12. Rising from the outer periphery of flange 30 is the inner web 32 of an inverted box-section member 33, whose outer web is outwardly flanged for connection, as shown, to the lower end of chamber sidewall 11. The member 33 is fairly heavy and rigid, excepting for the web 32, which is relatively thin and adapted for flexure. This flexible web 32 is preferably located over the nodal region of the vibratory plate 12.

It will be seen that the vibratory plate 12 and vibration generator 14 are suspended through the ring 13 from the sidewall 11 of the chamber 10, which is in turn suspended by its top from the top of the exterior casing 16. In operation, the plate 12 vibrating in the resonant mode described hereinabove, bows alternately upwardly and downwardly, with its nodal region, just under the web 32, standing substantially stationary, at least as regards vertical displacement. However, certain vibratory rocking of the studs 31 and ring flange 30 in the nodal region will occur, and such motion is absorbed by flexure of the web 32, and so prevented from transmission to the sidewalls of the chambers. With the type of vibration generator 14 to be described, the plate 12 may also be vibrated on its own plane. Such component of vibration is also absorbed by the flexible web 22. Accordingly, the chamber stands substantially stationary, excepting for the described vibratory movement of the bottom plate 12.

Bottom plate 12 is provided with a discharge outlet 36, to which is coupled discharge hose 37, here shown as leading outwardly through opening 28. The vibration generator 14 is of a mechanical, orbital-mass type, in this instance air driven, and air under pressure is conveyed thereto through air hose 38 led in through one of the casing openings 28, as shown. The raw material to be treated, e.g., sugarcane, is chopped into chunks, preferably of relatively small size, but there is no critical size. Such material is introduced into the chamber 10, and with this material I introduce a certain amount of coupling liquid, which may be water, or vegetable juice left over from a prior operation, in an amount sufficient to bathe the material and to form a good coupling contact with the walls of the treatment chamber as well as between the chunks of material. The amount of liquid used is not critical and enough may be used to nearly or substantially cover the material to be treated. In some cases, where the material contains a large proportion of easily available juice, the juice resulting from chopping of the raw material may furnish adequate coupling to the chamber walls and between the chunks or particles of material. This coupling liquid is of primary importance; and without a liquid coupling to the chamber, particularly to the lower vibratory plate 12, effective sonic wave transmission from the plate 12 through the material cannot be achieved. In my work with this apparatus, I have indeed found that the main part of the sound wave pattern transmitted through the batch is within the liquid. The vibratory plate 12, thus coupled intimately to the liquid, acts as a radiator of longitudinal sound waves which are transmitted upwards through the liquid and act upon the chunks of vegetable substance contained therewithin. The high sonic accelerations, and other sonic influences mentioned above, resulting from this sound wave transmission cause the juice and fibrous material to separate from one another, the extracted juice cyclically repenetrating the fibrous substance, and acting as a solvent for remaining juice bound within or between the fibers, whereby the juice substance is progressively extracted and separated from the fiber. As the process continues, the fiber rises to the surface of the juice, and can be separated by use of a sieve or fork-type implement. The remaining juice is conducted from the lower end of the treatment chamber via the hose 37.

This process thus consists in radiating longitudinal sound waves of low frequency but large amplitude through the coupling liquid, which is most effectively constituted of the juice of the vegetable, as earlier explained, and then transmitting it through the raw vegetable material. The raw vegetable material is thus subjected to a longitudinal sound wave pattern generated by and radiated from the plate 12. The chunks of vegetable material progressively disintegrate as the operation proceeds, apparently as the sound wave action drives the coupling liquid (juice) into the material. As before indicated, the sound wave transmission path is from the sonic radiator plate 12 primarily through the liquid, so that sound wave action occurs in the liquid and is transmitted from the liquid into the material. Good sonic coupling is attained from the liquid to the particles of material, and substantial sound wave transmission thus occurs also within the fibrous portions of the vegetable material, as well as within the bound or adherent juice, which may be in long continuous film form extending for a considerable path distance through or between the fibers. The sound wave action in the coupling liquid drives the liquid into the chunks of material, promoting disintegration, and consequently promoting additional coupling between the liquid and the material. This disintegration probably also ensues directly from sound wave transmission directly through both the fibrous and juice portions of the material. The high sonic accelerations experienced by the material, as described heretofore, and the other sonic wave influences mentioned in the foregoing, cooperate to break up the material, and to dissolve, wash out and separate the juice from the fiber.

As mentioned heretofore, the sound wave generator or transducer 14 is of a mechanical, orbital-mass type, capable of producing vibration in the desired low frequency range at high amplitude, and possessed of certain other inherent unique advantages. One simple illustrative form of suitable generator is shown in FIGS. 2 and 3, and will now be described. The generator comprises a housing 40 formed with a cylindric chamber 41, the housing being secured to plate 12 as by means of studs 42. The housing is formed with one integral side closure wall 44, and its opposite side is fitted with a removable closure wall 45. A center pin or axle 46 of circular cross-section, preferably formed with a central crowned or barrel-shaped portion 47, has reduced end portions 48 set tightly into walls 44 and 45. The crowned periphery of this axle 46 provides a roller bearing surface, which is surrounded by an orbital rotor in the form of an inertia ring 49, having a circular central opening 50 of substantially larger diameter than that of the portion 47 of the pin 46, the outer periphery of the ring having a suitable clearance with the periphery of the chamber 41 when hanging on the pin 46, or spinning thereabout.

The inertia ring 49 is caused to roll or spin in an orbital path about the pin 46 by a fluid jet, either air under pressure, steam, or liquid, introduced through an injection nozzle 52 formed in the housing 40 tangential to the periphery of the circular chamber 41, such fluid being introduced to the nozzle 52 via the aforementioned hose 38. The spent driving fluid may be discharged from chamber 41 as by way of orifices 53 formed in closure plates 45 as close to the center of the chamber 41 as possible.

The tangentially-introduced fluid causes the inertia ring 49 to roll or spin on the axle 46, and the centrifugal force exerted by the spinning ring on the axle and thence transmitted to the housing 40 and from there to the plate 12, applies vibratory forces to the plate, with a component of vibration normal to the plate. The spin frequency of the inertia ring depends upon the pressure of the air supply, and may be readily regulated to match or approximate the desired resonant frequency of the plate 12.

The use of a resonant frequency of the sonic radiation plate 12 is an important feature of the invention, for reasons explained hereinabove. Other types of orbital-mass mechanical oscillator or vibration generator are of course capable of substitution for the illustrative device here shown. In all cases, however, low frequency and high vibration amplitude are required, and a mechanical type oscillator, such as the air driven mechanical oscillator here shown, is an important contribution to and a part of the invention.

I claim:

1. The method of extracting juices from pieces of raw vegetable material comprised of fibrous substance with juices bound therein, that includes: generating high-amplitude sonic waves, of low frequency relative to the audible spectrum, by driving an inertia rotor repeatedly in an orbital path around the surface of a bearing, subjecting the pieces of vegetable material to said high-amplitude sonic waves by coupling said bearing to said material, whereby the juice is extracted from the fibrous substance, and the vegetable material gradually reduced to a residue of fibrous pulp and a body of extracted juice, and separating the juice from the pulp.

2. The method of extracting juices from pieces of raw vegetable material comprised of fibrous substance with juices bound therein, that includes: placing the pieces of raw vegetable material in a treatment chamber, introducing an acoustic coupling liquid into said chamber to fill in the spaces between said pieces of raw material, immersing in said coupling liquid a resonant sonic wave radiator, the resonant frequency of said wave radiator being low relative to the audible spectrum, generating high-amplitude sonic waves, at said resonant frequency of said wave radiator, by driving an inertia rotor repeatedly in an orbital path around the surface of a bearing, and coupling said bearing to said sonic wave radiator, said inertia rotor and bearing, together with said sonic radiator, having an output impedance corresponding sufficiently for good coupling to those of the coupling liquid and the juice and fiber constituents of said vegetable matter, so that sound waves are radiated effectively from said radiator into said coupling liquid and transmitted therethrough to and through the fiber and juice constituents of said vegetable matter whereby the juice is extracted from the fibrous substance, and the vegetable material gradually reduced to a residue of fibrous pulp and a body of extracted juice, and separating the juice from the pulp.

3. The method of claim 2, wherein the coupling liquid comprises previously extracted juice of the vegetable material.

References Cited by the Examiner

UNITED STATES PATENTS 2,473,453 6/1949 Shropshire.
3,218,188 11/1965 Lippe et al. _____ 146—227 X WILLIAM W. DYER, JR., *Primary Examiner.*

W. GRAYDON ABERCROMBIE, *Examiner.*